(12) United States Patent
Peer et al.

(10) Patent No.: US 10,489,282 B2
(45) Date of Patent: Nov. 26, 2019

(54) APPLICATION TESTING

(71) Applicant: ENTIT Software LLC, Sunnyvale, CA (US)

(72) Inventors: David Peer, Yehud (IL); Clement Arnaud Gaston Claude, Shanghai (CN); Fan Chen, Shanghai (CN); Eyal Fingold, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/566,840

(22) PCT Filed: Apr. 30, 2015

(86) PCT No.: PCT/CN2015/078055
§ 371 (c)(1),
(2) Date: Oct. 16, 2017

(87) PCT Pub. No.: WO2016/172950
PCT Pub. Date: Nov. 3, 2016

(65) Prior Publication Data
US 2018/0095869 A1 Apr. 5, 2018

(51) Int. Cl.
*G06F 9/44* (2018.01)
*G06F 11/36* (2006.01)
*G06F 16/2457* (2019.01)

(52) U.S. Cl.
CPC ...... *G06F 11/3688* (2013.01); *G06F 11/3664* (2013.01); *G06F 11/3684* (2013.01); *G06F 16/24578* (2019.01); *G06F 9/44* (2013.01)

(58) Field of Classification Search
CPC .... G06F 8/00; G06F 11/3688; G06F 11/3466; G06F 16/284; G06F 11/34;
(Continued)

(56) References Cited

U.S. PATENT DOCUMENTS 5,168,563 A * 12/1992 Shenoy ............... G06F 11/34
703/19
8,276,123 B1 * 9/2012 Deng ............... G06F 11/3688
714/37
(Continued)

FOREIGN PATENT DOCUMENTS

CN 1804808 A 7/2006
CN 101908020 A 12/2010
(Continued)

OTHER PUBLICATIONS

Campos, J., et al., Continuous Test Generation: Enhancing Continuous Integration with Automated Test Generation, ASE '14, Sep. 15-19, 2014, 12 pages.
(Continued)

*Primary Examiner* — Tuan A Vu (57) ABSTRACT

Examples disclosed herein relate to application testing. The examples may enable identifying a set of tests for testing an application and identifying a set of attributes associated with a particular test of the set of tests. The set of attributes may comprise an average execution duration of the particular test, a last execution time of the particular test, and a last execution status of the particular test. The examples may further enable determining attribute scores associated with individual attributes of the set of attributes and obtaining user-defined weights associated with the individual attributes. The examples may further enable determining a test score associated with the particular test based on the attribute scores and the user-defined weights associated with the individual attributes. The set of tests may be sorted based on the test score associated with the particular test. The sorted set of tests may be executed.

13 Claims, 5 Drawing Sheets

(58) Field of Classification Search
CPC ............. G06F 11/3672; G06F 11/3664; G06F 11/3684; G06F 16/24578; G06F 9/44; H04L 43/50
See application file for complete search history.

(56) References Cited

U.S. PATENT DOCUMENTS

| | | | |
|---|---|---|---|
| 8,910,124 B1* | 12/2014 | Bhansali | ............. G06F 11/3466 717/127 |
| 2007/0094189 A1 | 4/2007 | Yamamoto et al. | |
| 2009/0112562 A1* | 4/2009 | Holcomb | ................ H04L 43/50 703/20 |
| 2009/0265681 A1* | 10/2009 | Beto | ................... G06F 11/3672 717/100 |
| 2011/0288808 A1 | 11/2011 | Fan et al. | |
| 2014/0282353 A1* | 9/2014 | Jubran | ...................... G06F 8/00 717/101 |
| 2014/0289262 A1* | 9/2014 | Hasegawa | ............. G06F 16/284 707/748 |
| 2015/0026121 A1 | 1/2015 | Shani et al. | |

FOREIGN PATENT DOCUMENTS

| | | |
|---|---|---|
| GB | 2397905 A | 8/2004 |
| JP | 2004220269 A | 8/2004 |
| JP | 2010134643 A | 6/2010 |
| WO | WO-2013165367 | 11/2013 |

OTHER PUBLICATIONS

Continuous Test Generation: Enhancing Continuous Integration with Automated Test Generation.
International Searching Authority., International Search Report and Written Opinion dated Feb. 2, 2016 for PCT Application No. PCT/CN2015/078055 Filed Apr. 30, 2015, 12 pgs.

* cited by examiner

APPLICATION TESTING

BACKGROUND

Software applications are often tested by running a testing script to verify that the applications and the source code therein behave as expected and intended.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Software applications are often tested by running a testing script to verify that the applications and the source code therein behave as expected and intended. An "application," as used herein, may refer to any software application comprising code or machine-readable instructions for implementing various functions. A "test," as used herein, may refer to a single test or a test suite comprising a set of related tests. When a particular test is executed, a testing script corresponding to the particular test may be executed and/or run. When executed, the particular test may test various aspects of the application to verify that the application and the code therein behave as expected and intended. In many cases, an application may undergo a large number of tests covering different aspects or features of the application. For example, when an application is developed, tested, and/or deployed using a continuous integration (CI) pipeline or a continuous deployment (CD) pipeline, a large number of tests being executed for various testing jobs in the pipeline may unnecessarily prolong the overall execution time of the pipeline, resulting in a waste of time and resources and creating a "window of error" for developers that want to commit new code. A "windows of error," as used herein, may refer to a time period during which the status (e.g., success or fail) of the current code being tested is unclear.

Examples disclosed herein provide technical solutions to these technical challenges by determining test scores associated with a set of tests for testing an application to sort the set of tests based on the test scores, and enforcing a time constraint during the execution of the sorted set of tests. The examples disclosed herein may enable identifying a set of tests for testing an application and identifying a set of attributes associated with a particular test of the set of tests. The set of attributes may comprise an average execution duration of the particular test, a last execution time of the particular test, and a last execution status of the particular test. The examples may further enable determining attribute scores associated with individual attributes of the set of attributes and obtaining user-defined weights associated with the individual attributes. The examples may further enable determining a test score associated with the particular test based on the attribute scores and the user-defined weights associated with the individual attributes. The set of tests may be sorted based on the test score associated with the particular test. The sorted set of tests may be executed.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Figure 1:
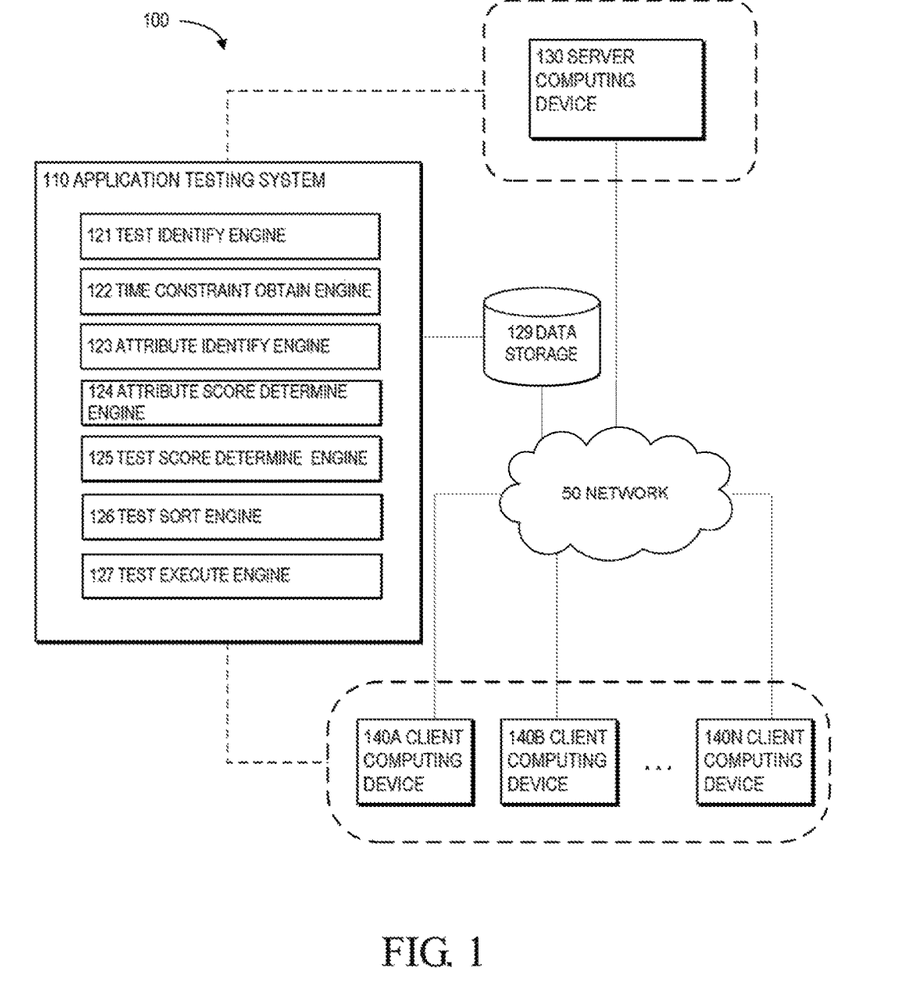
FIG. 1 is a block diagram depicting an example environment in which various examples may be implemented as an application testing system.

FIG. 1 is an example environment 100 in which various examples may be implemented as an application testing system 110. Environment 100 may include various components including server computing device 130 and client computing devices 140 (illustrated as 140A, 1408, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, application testing system 110 and the various components described herein may be implemented in hardware and/or a combination of hardware and programming that configures hardware. Furthermore, in FIG. 1 and other Figures described herein, different numbers of components or entities than depicted may be used.

Application testing system 110 may comprise a test identify engine 121, a time constraint obtain engine 122, an attribute identify engine 123, an attribute score determine engine 124, a test score determine engine 125, a test sort engine 126, a test execute engine 127, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Test identify engine 121 may identify a set of tests for testing an application. An "application," as used herein, may refer to any software application comprising code or machine-readable instructions for implementing various functions. A "test," as used herein, may refer to a single test or a test suite comprising a set of related tests. When a particular test is executed, a testing script corresponding to the particular test may be executed and/or run. When executed, the particular test may test various aspects of the application to verify that the application and the code therein behave as expected and intended. In some implementations, any testing software known in the art may be used to execute and/or run the plurality of tests (or any portion thereof) as discussed herein. A test may be classified into, for example, various types of tests: a unit test, Application Program Interface (API) test, functional test, end-to-end (E2E) test, performance test, etc.

In some implementations, the application may be tested in (and/or as part of) a continuous integration (CI) pipeline or a continuous deployment (CD) pipeline. A "CI pipeline," as used herein, may refer to a test-driven development process that enables building (or developing code) and automated and continuous testing of the code. For example, the CI pipeline may include a build job (e.g., building code) and a unit testing job (e.g., composed of a set of unit tests). This continuous application of quality control allows software to be developed to a high standard and easily packaged and deployed. A "CD pipeline," as used herein, may extend the CI pipeline by adding the deployment to test and staging environments and the deployment to production as part of the pipeline. For example, the CD pipeline may include the deployment to a testing environment, an API testing job, a functional testing job, the deployment to a staging environment, an E2E testing job, a performance testing job, and/or the deployment to production.

As discussed above, the CI or CD pipeline may comprise at least one testing job. A "testing job" in the pipeline, as used herein, may comprise at least one test that is assigned to that particular testing job. The test assigned to the particular testing job may be scheduled to be executed during that particular testing job. For example, a particular unit testing job may include a set of unit tests to be executed during the particular unit testing job. As such, among the set of tests as identified by test identify engine 121 for testing the application, at least a subset of that set of tests may be assigned to a particular testing job. In some implementations, a particular testing job may be associated with a job policy that defines tests that are assigned to the particular testing job. Different testing jobs may have the same or different subsets of the set of tests. For example, the set of tests identified for testing the application may include 5 tests (e.g., a first test, a second test, a third test, a fourth test, and a fifth test). A first testing job in the pipeline may be assigned with the first and second tests, a second testing job in the pipeline may be assigned with the first and third tests, and both of third and fourth testing jobs in the pipeline may be assigned with the fourth and fifth tests.

In some implementations, a time constraint may be specified for at least a portion of the CI or CD pipeline (e.g., a single testing job, a plurality of testing jobs, a portion of the pipeline, and/or the entire pipeline). A "time constraint," as used herein, may refer to a time limitation that is applied to the at least the portion of the CI or CD pipeline. The time constraint may be defined in any time unit including milliseconds, seconds, minutes, hours, etc. Time constraint obtain engine 122 may obtain the time constraint in various ways. In one example, the time constraint may be specified based on user input (e.g., set by a system administrator, a developer, a testing engineer, etc.). In another example, a particular testing job may be associated with a job policy that defines the time constraint to be applied to the particular testing job.

Attribute identify engine 123 may identify a set of attributes associated with each test of the set of tests (e.g., as identified by test identify engine 121). For example, the set of attributes associated with a particular test may comprise an execution duration of the particular test, a last execution time of the particular test, a last execution status of the particular test, an indication of whether the particular test is a new test, a success ratio of the particular test, a story point associated with the particular test, a classification of the particular test, and/or other attributes. The set of attributes associated with the particular test may be maintained and/or stored in a data storage (e.g., data storage 129). In some implementations, attribute identify engine 123 may identify the set of attributes associated with each test in a particular testing job (e.g., to which a subset of the set of tests is assigned). The example attributes enumerated above are further described below.

An execution duration of the particular test may refer to a time duration that it takes for the execution of the particular test to complete (e.g., a time duration between a start time of the particular test and an end time of the particular test). In some implementations, this "execution duration" attribute may represent an average execution duration, a maximum execution duration, a minimum execution duration, a median execution duration, etc. that may be determined based on the past execution history (e.g., a past pre-determined time range) of the particular test. For example, assuming that the particular test has been run 3 times in the past 5 days with a first execution duration of 25 minutes, a second execution duration of 27 minutes, and a third execution duration of 21 minutes, the average execution duration of this test for the past 5 days may be 24.3 minutes.

A last execution time of the particular test may refer to a difference in time between a current time and a time that the particular test was executed the last time on the application. For example, the application was tested by the particular test at 5:30 PM, and the particular test has not been executed on that application since that time. Assuming that the current time is 7:30 PM on the same day, the last execution time of the particular test may be 2 hours.

A last execution status of the particular test may refer to an indication of whether the particular test was successfully executed on the application the last time. Returning to the above example, the last execution of the particular test at 5:30 PM may be associated with a status that indicates whether that test was successfully executed or failed (e.g., an error occurred during the execution of the test).

An indication of whether the particular test is a new test may refer to an indication of whether the particular test has been not executed on the application. For example, a developer may have written a new testing script or updated an existing testing script. The newly written testing script and/or updated testing script may be considered to be a new test that has not been executed on the application yet.

A success-failure ratio of the particular test may refer to a success ratio (e.g., the ratio of a number of times the particular test was successfully executed in a past pre-determined time range to a total number of times the particular test was executed in the past pre-determined time range) or a failure ratio (e.g., the ratio of a number of times the particular test failed in the past pre-determined time range to the total number of times the particular test was executed in the past pre-determined time range). For example, if the particular test was successfully executed 8 times out of 10 total test executions made on the application, the success ratio may be 80% while the failure ratio may be 20%.

A "story point," as used herein, may refer to a metric used in agile project management and development to determine (and/or estimate) the difficulty of implementing a given software feature in a given story. A "story," as used herein may refer to a particular business need assigned to a software development team to develop features for. For example, a number of story points assigned to a given feature may indicate the complexity of the given feature. If the particular test covers a particular set of features of the application, the story points (or the number thereof) associated with the particular test may indicate the overall complexity of the particular set of features.

A classification of the particular test may comprise a unit test, Application Program Interface (API) test, functional test, end-to-end (E2E) test, performance test, etc. The particular test may be classified based on user input and/or automatically classified by system 110.

Attribute score determine engine 124 may determine attribute scores associated with individual attributes of the set of attributes (e.g., identified by attribute identify engine 123). For example, attribute score determine engine 124 may determine a first attribute score associated with a first attribute (e.g., execution duration) of the particular test, a second attribute score associated with a second attribute (e.g., last execution time) of the particular test, a third attribute score associated with a third attribute (e.g., last execution status) of the particular test, and so on. In some implementations, attribute score determine engine 124 may obtain user-defined weights associated with the individual attributes. Returning to the example above, a user may define a first weight to be applied to the first attribute of the particular test, a second weight to be applied to the second attribute of the particular test, a third weight to be applied to the third attribute of the particular test, and so on.

Example algorithms that can be used to determine the attribute scores are shown in Table 1. Consider the following example scenario: a particular testing job may include a total of 5 different tests. The second attribute (e.g., last execution time) of each of the five tests may be identified (e.g., by attribute identify engine 123): a first test was executed 5 hours ago, a second test was executed 10 hours ago, a third test was executed 30 hours ago, a fourth test was executed 35 hours ago, and a fifth test was executed 50 hours ago. Attribute score determine 124 may determine the second attribute score associated with the first test by using the example algorithm in Table 1 where Vi is 5 hours, min(V) is 5 hours (e.g., a minimum last execution time amongst 5 hours, 10 hours, 35 hours, and 50 hours), and max(V) is 50 hours (e.g., a maximum last execution time amongst 5 hours, 10 hours, 35 hours, and 50 hours). In this case, the second attribute score associated with the first test may equal to 0. Similarly, the second attribute score associated with third test may equal to 0.67 where Vi is 35 hours. To provide another example, the second attribute score associated with the fifth test may equal to 1 where Vi is 50 hours. Given that the fifth test has not been executed for the past 50 hours, it may make sense to give a higher second attribute score for the fifth test than the rest of the tests such that the fifth test may be given a higher priority than the other tests.

TABLE 1

| ATTRIBUTE (V) | ATTRIBUTE SCORE |
| --- | --- |
| Average Execution Duration | $\left(1 - \frac{V_i - \min(V)}{\max(V) - \min(V)}\right)$ |
| Last Execution Time | $\left(\frac{V_i - \min(V)}{\max(V) - \min(V)}\right)$ |
| Last Execution Status | (Status = Fail ? 1 : 0) |
| New Test | (IsNewTest ? 1 : 0) |
| Success Ratio | (1 − SuccessRatio) |
| Number of Story Points | $\left(\frac{V_i - \min(V)}{\max(V) - \min(V)}\right)$ |
| Classification | ClassificationWeight |

Note that the example algorithm given for the "execution duration" attribute would return a higher attribute score to the test with a shorter execution duration such that the test that runs faster may be considered for execution before considering another test that runs slower. The example algorithm given for the "last execution status" attribute returns a higher attribute score to the test with a "failed" status such that the failed test can be considered for execution before considering another test that was successfully executed the last time. The example algorithm given for the "new test" attribute rectums a higher attribute score to the test that is a new test such that the new test can be considered for execution before considering an old test that has been already executed in the past. The example algorithm given for the "success ratio" attribute rectums a higher attribute score to the test that has a lower success ratio such that the one with a lower success ratio can be considered for execution before considering another test with a higher success ratio. The example algorithm given for the "number of story points" attribute rectums a higher attribute score to the test associated with a higher number of story points, meaning that the test covering more complex features may be considered for execution before considering another test covering simpler features. As to the "classification" attribute, each classification type (e.g., unit test, functional test, performance test, etc.) may have a user-defined classification weight. For example, a user may set a higher classification weight for a unit test than a performance test such that the unit test may be considered for execution before considering the performance test for execution.

Test score determine engine 125 may determine a test score associated with the particular test based on the attribute scores (e.g., associated the individual attributes of the particular test) and the user-defined weights associated with the individual attributes. Each of the attribute scores may be scaled by a corresponding user-defined weight, as shown in Table 2. For example, test score determine engine 125 may obtain a first user-defined weight (e.g., W1 of Table 2) associated with the first attribute (e.g., average execution duration) of the particular test. The first attribute score of the first attribute may then be scaled by (e.g., multiplied by) the first user-defined weight.

Test score determine engine 125 may determine the test score associated with the particular test by calculating a sum of the scaled attribute scores of the set of attributes. For example, test score determine engine 125 may calculate the sum of the scaled attribute score of the first attribute associated with the particular test, the scaled attribute score of the second attribute associated with the particular test, the scaled attribute score of the third attribute associated with the particular test, and so on. In some implementations, test score determine engine 125 may determine the test score associated with the particular test by calculating an average of, a median of, a maximum of, a minimum of, and/or other representative value of the attribute scores (e.g., in descending order of test scores associated with individual tests of the subset of tests).

Test execute engine 127 may cause the sorted set of tests to be executed (e.g., a test with a higher test score is executed prior to the execution of another test with a lower test score). In some instances, a time constraint may be applied to the set of tests (e.g., by time constraint obtain engine 122). In these instances, after test execute engine 127 executes a first test of the sorted set of tests (e.g., the first test having the highest test score among the test scores associated with the individual tests of the set of tests), test execute engine 127 may determine whether an execution duration of the first test is below the time constraint. In response to determining that the execution duration of the first test is below the time constraint, test execution engine 127 may cause a second test of the sorted set to be executed (e.g., the second test having the second highest test score among the test scores associated with the individual tests of the set of tests).

After the second test is executed, test execution engine 127 may determine whether a total execution duration of the first and second tests is below the time constraint. Again, in response to determining that the total execution duration of the first and second tests is below the time constraint, test execution engine 127 may cause a third test to be executed (e.g., the third test having the third highest test score among the test scores associated with the individual tests of the set of tests). After the third test is executed, test execution engine 127 may determine whether the total execution duration of the first, second, and third tests is below the time constraint. This process may iterate until the total execution duration is not below the time constraint or all of the set of tests are executed. In response to determining that the total execution duration is not below (e.g., exceeds or is above and/or equal to) the time constraint, test execution engine 127 may prevent the next test (e.g., of the sorted set) from being executed.

TABLE 2

| ATTRIBUTE (V) | WEIGHT (W) | ATTRIBUTE SCORE | SCALED ATTRIBUTE SCORE |
|---|---|---|---|
| Average Execution Duration | W1 | $\left(1 - \frac{V_i - \min(V)}{\max(V) - \min(V)}\right)$ | $W1 + \left(1 - \frac{V_i - \min(V)}{\max(V) - \min(V)}\right)$ |
| Last Execution Time | W2 | $\left(\frac{V_i - \min(V)}{\max(V) - \min(V)}\right)$ | $W2 + \left(\frac{V_i - \min(V)}{\max(V) - \min(V)}\right)$ |
| Last Execution Status | W3 | (Status = Fail ? 1 : 0) | W3 + (Status = Fail ? 1 : 0) |
| New Test | W4 | (IsNewTest ? 1 : 0) | W4 + (IsNewTest ? 1 : 0) |
| Success Ratio | W5 | (1 − SuccessRatio) | W5 + (1 − SuccessRatio) |
| Number of Story Points | W6 | $\left(\frac{V_i - \min(V)}{\max(V) - \min(V)}\right)$ | $W6 + \left(\frac{V_i - \min(V)}{\max(V) - \min(V)}\right)$ |
| Classification | W7 | ClassificationWeight | W7 + ClassificationWeight |

Test sort engine 126 may sort the set of tests based on the test score associated with the particular test (and/or the test score associated with each of the set of tests). For example, the set of tests may be sorted in descending order of test scores associated with individual tests of the set of tests. In this example, if a first test has a higher test score than a second test with a lower test score, the first test may be sorted higher than the second test. In some implementations, the subset of tests in a particular testing job may be sorted In some implementations, test execute engine 127 may cause a first test of the sorted subset of tests to be executed during the particular testing job before a second test of the sorted subset of tests is executed, wherein a first test score associated with the first test is higher than a second test score associated with the second test. In some instances, a time constraint may be applied to the particular testing job (e.g., by time constraint obtain engine 122). In these instances, after test execute engine 127 executes the first test of the sorted subset (e.g., the first test having the highest test score among the test scores associated with the individual tests of the subset of tests), test execute engine 127 may determine whether an execution duration of the first test is below the time constraint. In response to determining that the execution duration of the first test is below the time constraint, test execution engine 127 may cause the second test of the sorted subset set to be executed during the same testing job (e.g., the second test having the second highest test score among the test scores associated with the individual tests of the subset of tests).

After the second test is executed, test execution engine 127 may determine whether a total execution duration of the first and second tests is below the time constraint. Again, in response to determining that the total execution duration of the first and second tests is below the time constraint, test execution engine 127 may cause a third test to be executed during the same testing job (e.g., the third test having the third highest test score among the test scores associated with the individual tests of the subset of tests). After the third test is executed, test execution engine 127 may determine whether the total execution duration of the first, second, and third tests is below the time constraint. This process may iterate until the total execution duration is not below the time constraint or all of the subset of tests are executed. In response to determining that the total execution duration is not below (e.g., exceeds or is above and/or equal to) the time constraint, test execution engine 127 may prevent the next test (e.g., of the sorted subset) from being executed.

In some implementations, the CI or CD pipeline may comprise another testing job (e.g., the next testing job) after the particular testing job. The next testing job may comprise a second subset of the set of tests. In response to determining that the total execution duration is not below the time constraint in the particular testing job, test execution engine 127 may cause at least one test of the second subset to be executed. In other words, test execution engine 127 may stop executing any more tests in the particular testing job, and move to the next testing job.

In performing their respective functions, engines 121-127 may access data storage 129 and/or other suitable database(s). Data storage 129 may represent any memory accessible to application testing system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Application testing system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
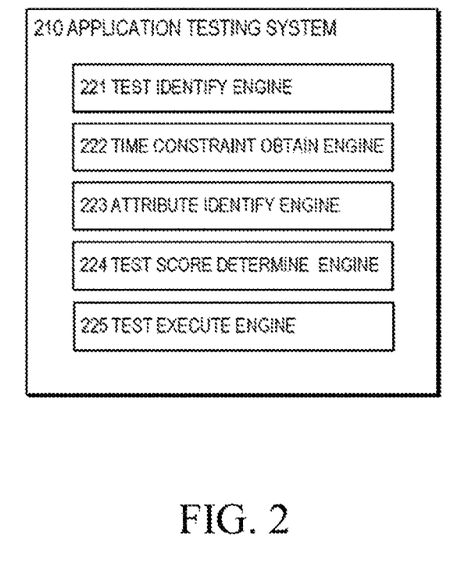
FIG. 2 is a block diagram depicting an example application testing system.

FIG. 2 is a block diagram depicting an example application testing system 210. Application testing system 210 may comprise a test identify engine 221, a time constraint obtain engine 222, an attribute identify engine 223, a test score determine engine 224, a test execute engine 225, and/or other engines. Engines 221-225 represent engines 121-123, 125, and 127, respectively.

Figure 3:
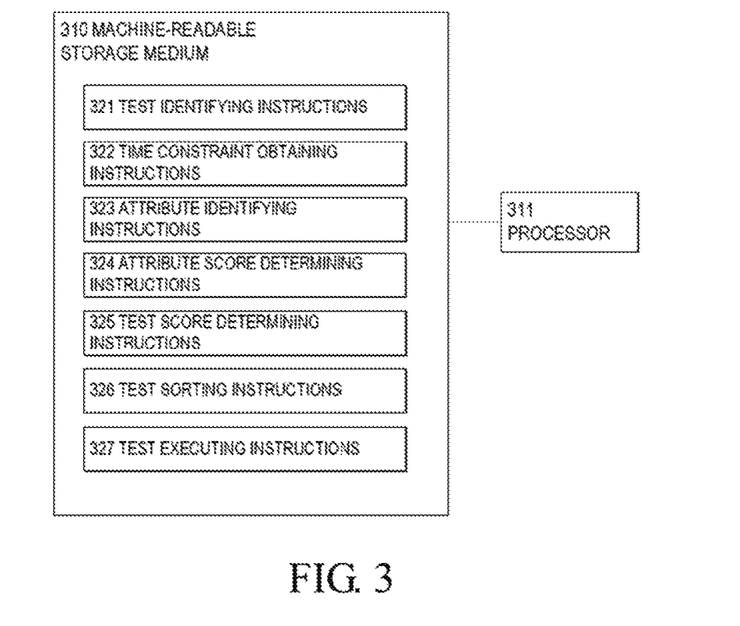
FIG. 3 is a block diagram depicting an example machine-readable storage medium comprising instructions executable by a processor for application testing.

FIG. 3 is a block diagram depicting an example machine-readable storage medium 310 comprising instructions executable by a processor for application testing.

In the foregoing discussion, engines 121-127 were described as combinations of hardware and programming. Engines 121-127 may be implemented in a number of fashions. Referring to FIG. 3, the programming may be processor executable instructions 321-327 stored on a machine-readable storage medium 310 and the hardware may include a processor 311 for executing those instructions. Thus, machine-readable storage medium 310 can be said to store program instructions or code that when executed by processor 311 implements application testing system 110 of FIG. 1.

In FIG. 3, the executable program instructions in machine-readable storage medium 310 are depicted as test identifying instructions 321, time constraint obtaining instructions 322, attribute identifying instructions 323, attribute score determining instructions 324, test score determining instructions 325, test sorting instructions 326, and test executing instructions 327. Instructions 321-327 represent program instructions that, when executed, cause processor 311 to implement engines 121-127, respectively.

Figure 4:
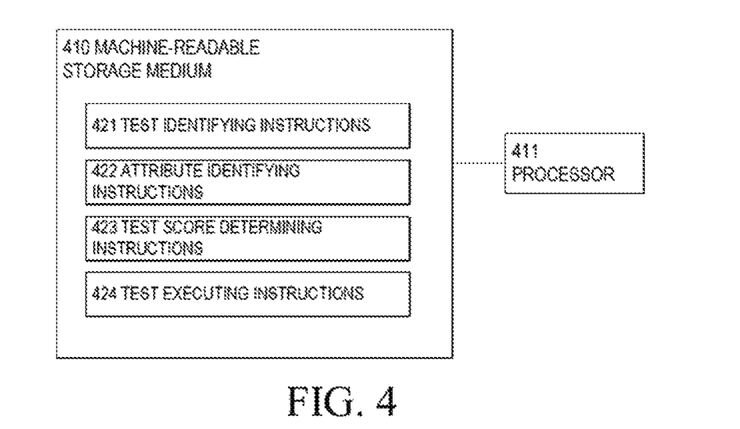
FIG. 4 is a block diagram depicting an example machine-readable storage medium comprising instructions executable by a processor for application testing.

FIG. 4 is a block diagram depicting an example machine-readable storage medium 410 comprising instructions executable by a processor for application testing.

In the foregoing discussion, engines 121-127 were described as combinations of hardware and programming. Engines 121-127 may be implemented in a number of fashions. Referring to FIG. 4, the programming may be processor executable instructions 421-424 stored on a machine-readable storage medium 410 and the hardware may include a processor 411 for executing those instructions. Thus, machine-readable storage medium 410 can be said to store program instructions or code that when executed by processor 411 implements application testing system 110 of FIG. 1.

In FIG. 4, the executable program instructions in machine-readable storage medium 410 are depicted as test identifying instructions 421, attribute identifying instructions 422, test score determining instructions 423, and test executing instructions 424. Instructions 421-424 represent program instructions that, when executed, cause processor 411 to implement engines 121, 123, 125, and 127, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement application testing system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-327, and/or other instructions. As an alternative or in addition to retrieving and executing instructions, processor 311 may include at least one electronic circuit comprising a number of electronic components for performing the functionality of at least one of instructions 321-327, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-424, and/or other instructions. As an alternative or in addition to retrieving and executing instructions, processor 411 may include at least one electronic circuit comprising a number of electronic components for performing the functionality of at least one of instructions 421-424, and/or other instructions.

Figure 5:
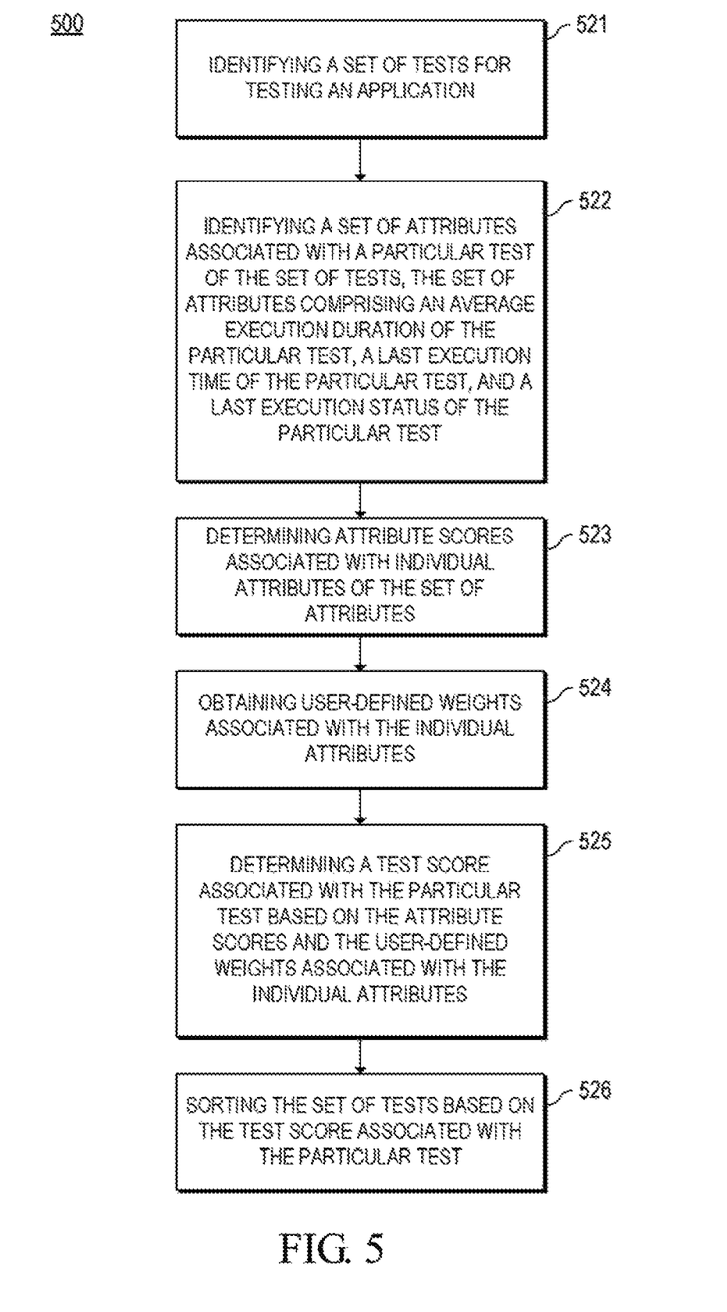
FIG. 5 is a flow diagram depicting an example method for application testing.

FIG. 5 is a flow diagram depicting an example method 500 for application testing. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant to be an example and, as such, should not be viewed as limiting. Method 500 may be implemented in the form of executable instructions stored on a machine-readable storage medium, such as storage medium 310, and/or in the form of electronic circuitry.

In block 521, method 500 may include identifying a set of tests for testing an application. Referring back to FIG. 1, test identify engine 121 may be responsible for implementing block 521.

In block 522, method 500 may include identifying a set of attributes associated with a particular test of the set of tests. The set of attributes may comprise an average execution duration of the particular test, a last execution time of the particular test, and a last execution status of the particular test. Referring back to FIG. 1, attribute identify engine 123 may be responsible for implementing block 522.

In block 523, method 500 may include determining attribute scores associated with individual attributes of the set of attributes. Referring back to FIG. 1, attribute score determine engine 124 may be responsible for implementing block 523.

In block 524, method 500 may include obtaining user-defined weights associated with the individual attributes. Referring back to FIG. 1, attribute score determine engine 124 may be responsible for implementing block 524.

In block 525, method 500 may include determining a test score associated with the particular test based on the attribute scores and the user-defined weights associated with the individual attributes. Referring back to FIG. 1, test score determine engine 125 may be responsible for implementing block 525.

In block 526, method 500 may include sorting the set of tests based on the test score associated with the particular test. Referring back to FIG. 1, test sort engine 126 may be responsible for implementing block 526.

Figure 6:
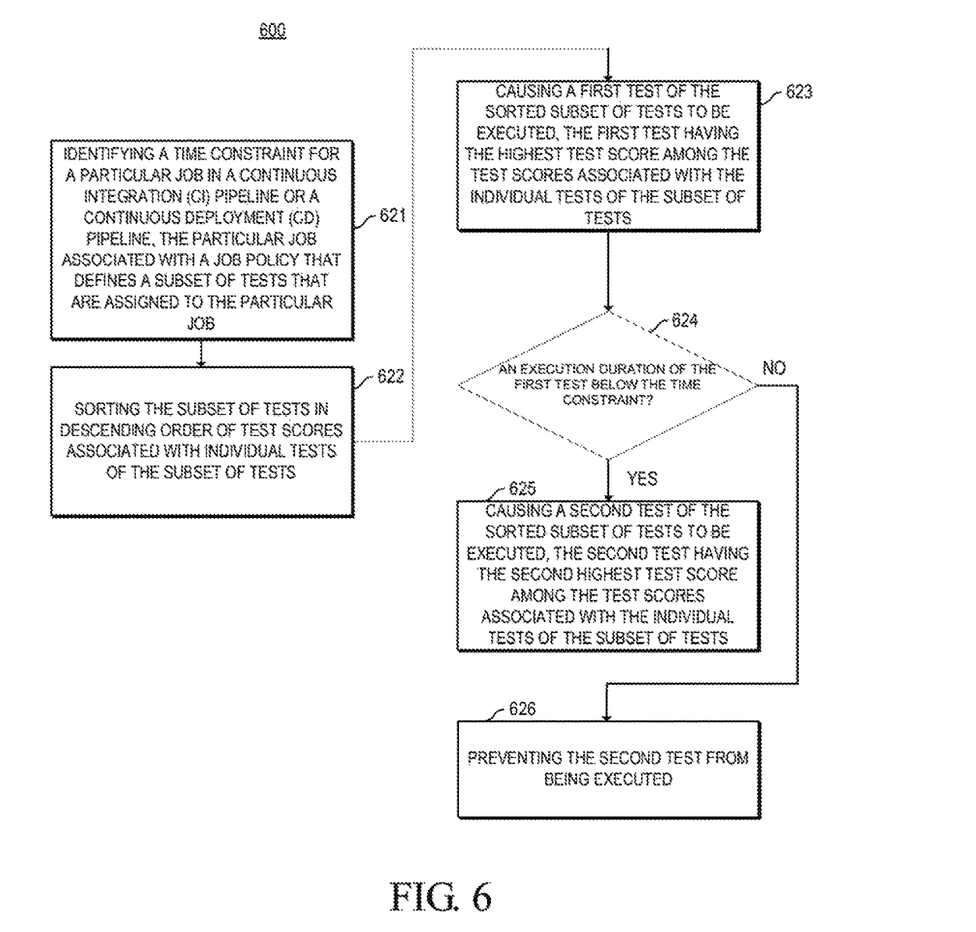
FIG. 6 is a flow diagram depicting an example method for application testing.

FIG. 6 is a flow diagram depicting an example method 600 for application testing. Method 600 as illustrated (and described in greater detail below) is meant to be an example and, as such, should not be viewed as limiting. Method 600 may be implemented in the form of executable instructions stored on a machine-readable storage medium, such as storage medium 210, and/or in the form of electronic circuitry.

In block 621, method 600 may include identifying a time constraint for a particular job in a CI pipeline or a CD pipeline. The particular job may be associated with a job policy that defines a subset of tests (e.g., of the set of tests) that are assigned to the particular job. Referring back to FIG. 1, time constraint obtain engine 122 may be responsible for implementing block 621.

In block 622, method 600 may include sorting the subset of tests in descending order of test scores associated with individual tests of the subset of tests. Referring back to FIG. 1, test sort engine 126 may be responsible for implementing block 622.

In block 623, method 600 may include causing a first test of the sorted subset of tests to be executed. The first test may have the highest test score among the test scores associated with the individual tests of the subset of tests. Referring back to FIG. 1, test execute engine 127 may be responsible for implementing block 623.

In block 624, method 600 may include determining whether an execution duration of the first test is below the time constraint. Referring back to FIG. 1, test execute engine 127 may be responsible for implementing block 624. If the execution duration of the first test is below the time constraint, method 600 may proceed to block 625. On the other hand, if determined that the execution duration of the first test is not below (e.g., exceeds or above and/or equal to) the time constraint, method 600 may proceed to block 656.

In block 625, method 600 may include causing a second test of the sorted subset of tests to be executed. The second test may have the second highest test score among the test scores associated with the individual tests of the subset of tests. Referring back to FIG. 1, test execute engine 127 may be responsible for implementing block 625.

In block 626, method 600 may include preventing the second test from being executed. Referring back to FIG. 1, test execute engine 127 may be responsible for implementing block 626.

The foregoing disclosure describes a number of example implementations for application testing. The disclosed examples may include systems, devices, computer-readable storage media, and methods for application testing. For purposes of explanation, certain examples are described with reference to the components illustrated in FIGS. 1-4.

The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for application testing, the method comprising:
    identifying a set of tests for testing an application, wherein the set of tests are associated with a particular testing job;
    identifying a set of attributes associated with a particular test of the set of tests, the set of attributes comprising an average execution duration of the particular test, a last execution time of the particular test, and a last execution status of the particular test;
    determining attribute scores associated with individual attributes of the set of attributes;
    obtaining user-defined weights associated with the individual attributes;
    determining a test score associated with the particular test based on the attribute scores and the user-defined weights associated with the individual attributes;
    sorting the set of tests based on the test score associated with the particular test; and
    causing the sorted set of tests to be executed, wherein causing the sorted set of tests to be executed comprises, in response to determining that the average execution duration of the particular test does not exceed a time constraint for the particular testing job, causing a second test of the sorted set of tests to be executed during the particular testing job.

2. The method of claim 1, further comprising:
    identifying average execution durations of individual tests of the set of tests;
    determining a minimum average execution duration amongst the average execution durations of the individual tests;
    determining a maximum average execution duration amongst the average execution durations of the individual tests; and
    determining a first attribute score of the attribute scores based on the minimum average execution duration and the maximum average execution duration.

3. The method of claim 1, further comprising:
    identifying last execution times of individual tests of the set of tests, the last execution time of the particular test comprising a difference in time between a current time and a time that the particular test was executed the last time on the application;
    determining a minimum last execution time amongst the last execution times of the individual tests;
    determining a maximum last execution time amongst the last execution times of the individual tests; and
    determining a second attribute score of the attribute scores based on the minimum last execution time and the maximum last execution time.

4. The method of claim 1, wherein the last execution status of the particular test indicates whether the particular test was successfully executed on the application the last time, further comprising:
    determining a third attribute score of the attribute scores based on the last execution status.

5. The method of claim 2, further comprising:
    obtaining a first user-defined weight associated with the average execution duration of the particular test; and
    determining the test score associated with the particular test, the test score including the first attribute score scaled by the first user-defined weight.

6. The method of claim 1, wherein the particular testing job is associated with a continuous integration (CI) pipeline or a continuous deployment (CD) pipeline and associated with a job policy that defines a subset of tests in the set of tests that are assigned to the particular testing job.

7. The method of claim 6, further comprising:
    sorting the subset of tests in descending order of test scores associated with individual tests of the subset of tests;
    causing a first test of the sorted subset of tests to be executed, the first test having the highest test score among the test scores associated with the individual tests of the subset of tests;
    determining whether an execution duration of the first test is below the time constraint; and
    in response to determining that the execution duration of the first test is below the time constraint, causing a second test of the sorted subset of tests to be executed, the second test having the second highest test score among the test scores associated with the individual tests of the subset of tests.

8. A non-transitory machine-readable storage medium comprising instructions executable by a processor of a computing device for application testing, the machine-readable storage medium comprising:
    instructions to identify a set of tests for testing an application in a continuous integration (CI) pipeline or a continuous deployment (CD) pipeline, the CI or CD pipeline comprising a current testing job to which a first subset of the set of tests is assigned;
    instructions to identify a first set of attributes associated with a first test of the first subset, the first set of attributes comprising at least one of: an average execution duration of the first test, a last execution time of the first test, and a last execution status of the first test;
    instructions to identify a second set of attributes associated with a second test of the first subset, the second set of attributes comprising at least one of: an average execution duration of the second test, a last execution time of the second test, and a last execution status of the second test;
    instructions to determine a first test score associated with the first test based on the first set of attributes, and user-defined weights associated with the first set of attributes;
    instructions to determine a second test score associated with the second test based on the second set of attributes, and user-defined weights associated with the second set of attributes, instructions to sort the set of tests based on the first test score and the second test score, wherein the first test score is higher than the second test score;

instructions to cause the first test to be executed during the current testing job before the second test is executed; and instructions to cause the second test to be executed during the current testing job in response to determining that the average execution duration of the first test does not exceed a time constraint for the current testing job.

9. The non-transitory machine-readable storage medium of claim 8, further comprising:

instructions to obtain the time constraint for the current testing job;

instructions to determine whether the average execution duration of the first test exceeds the time constraint; and in response to determining that the average execution duration of the first test exceeds the time constraint, instructions to prevent the second test from being executed.

10. The non-transitory machine-readable storage medium of claim 8, further comprising:

instructions to determine a first attribute score associated with a first attribute of the first set of attributes;

instructions to obtain a first user-defined weight associated with the first attribute; and instructions to determine the first test score based on the first attribute score scaled by the first user-defined weight.

11. The non-transitory machine-readable storage medium of claim 10, further comprising:

instructions to determine a second attribute score associated with the first attribute of the second set of attributes;

instructions to determine the second test score based on the second attribute score scaled by the first user-defined weight; and instructions to sort the first test and the second test by comparing the first test score with the second test score.

12. A system for application testing comprising:

a processor that:

identifies a set of tests for testing an application in a continuous integration (CI) pipeline or a continuous deployment (CD) pipeline, the CI or CD pipeline comprising a particular testing job to which a first test and a second test of the set of tests are assigned;

obtains a time constraint for the particular testing job;

identifies a set of attributes associated with each of the first and second tests, the set of attributes comprising at least one of: an average execution duration, a last execution time, and a last execution status;

determines a first test score associated with the first test based on the set of attributes associated with the first test, and user-defined weights associated with the set of attributes;

determines a second test score associated with the second test based on the set of attributes associated with the second test, and user-defined weights associated with the set of attributes;

sort the set of tests based on the first test score and the second test score, wherein the first test score is higher than the second test score;

causes the first test to be executed during the particular testing job prior to an execution of the second test;

determines whether an execution duration of the first test exceeds the time constraint; and in response to determining that the execution duration of the first test exceeds the time constraint, prevents the second test from being executed; and in response to determining that the execution duration of the first test does not exceed the time constraint, causes the second test to be executed during the particular testing job.

13. The system of claim 12, wherein the set of attributes associated with the first test comprises at least one of: an indication of whether the first test is a new test, a success ratio of the first test, a story point associated with the first test, and a classification of the first test.

* * * * *